United States Patent
Weigel

(10) Patent No.: US 6,371,659 B1
(45) Date of Patent: Apr. 16, 2002

(54) OPTICAL CONNECTOR SYSTEM

(75) Inventor: Hans-Dieter Weigel, Caputh (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/583,985

(22) Filed: May 30, 2000

Related U.S. Application Data

(63) Continuation of application No. PCT/DE98/03169, filed on Oct. 23, 1998.

(30) Foreign Application Priority Data

Nov. 28, 1997 (DE) .......................................... 197 54 773

(51) Int. Cl.⁷ ................................................. G02B 6/38
(52) U.S. Cl. ............................. 385/59; 385/55; 385/71
(58) Field of Search ............................... 385/53–56, 59, 385/60, 63, 71, 72, 76

(56) References Cited

U.S. PATENT DOCUMENTS

| | | | |
|---|---|---|---|
| 4,312,564 A | * | 1/1982 | Cefarelli et al. ............... 385/59 |
| 4,405,201 A | * | 9/1983 | Cefarelli et al. ............... 385/59 |
| 4,645,295 A | * | 2/1987 | Pronovost .................... 385/55 |
| 5,138,680 A | | 8/1992 | Briggs et al. |

FOREIGN PATENT DOCUMENTS

| | | |
|---|---|---|
| DE | 29 33 790 | 5/1982 |
| DE | 28 45 420 | 11/1984 |
| DE | 195 39 594 | 12/1996 |
| EP | 0 505 197 | 9/1992 |
| EP | 0 712 015 | 5/1996 |
| EP | 0 807 837 | 11/1997 |

OTHER PUBLICATIONS

Published International Application No. WO 97/34176 (De Marchi et al.), dated Sep. 18, 1997, as mentioned on p. 3 of the specification.

* cited by examiner

*Primary Examiner*—Hemang Sanghavi
*Assistant Examiner*—Sarah U. Song
(74) *Attorney, Agent, or Firm*—Herbert L. Lerner; Laurence A. Greenberg; Werner H. Stemer

(57) ABSTRACT

The connector system includes a coupling bush in each of whose openings on both sides a multiway connector, each with a connector housing, can be inserted. A plurality of individual plug connectors having alignment elements are mounted in a floating manner in each connector housing. Alignment aids on the connector housings lead during the mating process and directly align the connector housings with respect to one another before the alignment elements of the individual plug connectors start to cooperate, with mutual fine alignment. The two housings have the same alignment aids which are disposed such that, when one of said multiway connectors is rotated through 180° about its longitudinal axis with respect to the other one, the alignment aids are aligned to cooperate with one another and to allow the two connectors to mate.

5 Claims, 1 Drawing Sheet

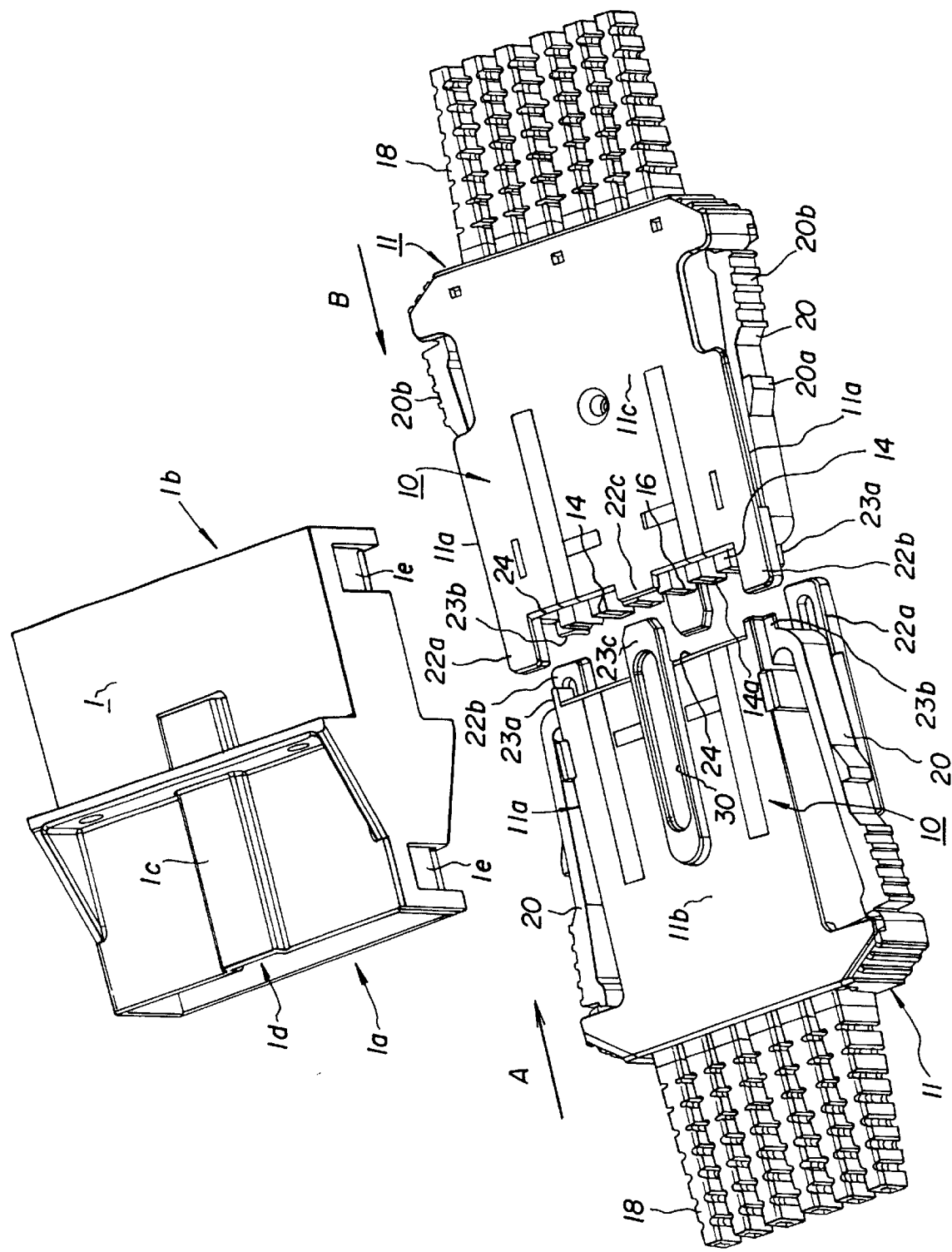

OPTICAL CONNECTOR SYSTEM

CROSS-REFERENCE TO RELATED APPLICATION

This is a continuation of copending International Application PCT/DE98/03169, filed Oct. 23, 1998, which designated the United States.

BACKGROUND OF THE INVENTION

FIELD OF THE INVENTION

The invention relates to the field of mechanical connecting devices for optical conductors and can be used for the structural design of multichannel multifiber connectors which can be mated and in which the connector housings are provided with alignment aids for lining up the individual plug connectors, which are arranged in the connector housing, with one another.

In multiway connectors of this type, individual plug connectors, which are also referred to as optical end pieces or ferrules, are float-mounted in the common connector housing. The individual plug connectors each terminate one or more optical conductors at the end, in such a manner that the optical conductors end on a coupling end surface which is suitable for optical coupling to an opposing coupling partner.

For the purposes of the present invention, the term optical conductor means a conductor which is suitable for carrying and passing on an optical signal, such as prefabricated optical conductor cables, optical conductor strips or optical conductors formed on a substrate (so-called "waveguides"). The individual plug connectors, and thus the optical conductor ends (coupling partners) held by them must be positioned highly accurately with respect to one another. To this end, the individual plug connectors are normally provided with corresponding alignment elements; the alignment elements comprise, for example, centering pins which extend in front of the other items out of the coupling end face of one individual plug connector in the mating direction, and complementary alignment elements in the form of holes, which are matched to the centering pins, on the other individual plug connector. Since the physical dimensions are comparatively small overall, these alignment means can be stressed only lightly in mechanical terms and they allow alignment only if adequate prealignment of the coupling partners with respect to one another is ensured.

In one prior art optical connector system, alignment aids are provided on the two connector housing and align the connector housings directly with respect to one another when the multiway connectors are mated, before alignment elements of the individual plug connectors start to cooperate, providing fine alignment of the individual plug connectors to be coupled with the alignment elements of the individual plug connectors on the opposing multiway connector. There, one connector housing is detachably mechanically fixed via locking elements in a guide bush which is used to accomodate the other connector housing, with the second connector housing being latched to the first connector housing by means of spring-loaded alignment aids (see European published patent application EP 0 807 837 A1).

In another prior art optical connector system, the two connector housings are held together by friction forces between alignment aids which are relatively long in the axial direction of the connector system and are designed differently on the two connector housings (see International PCT publication WO 97/34176 A1).

In a further prior art optical connector system, the two connector housings, which are provided with different alignment aids, are inserted into a bush which is used for prior alignment of the connector housing and which is latched to one connector housing (see German paten DE 19539549 C1). When the two connector housings are mated in the bush, the tolerance elements of both the bush and the connector housings as well as the clearance fits to be provided between these elements have an additive effect, which is disadvantageous from the point of view of prealignment of the alignment elements of the individual plug connectors.

SUMMARY OF THE INVENTION

It is accordingly an object of the invention to provide an optical connector system, which overcomes the above-mentioned disadvantages of the heretofor-known devices and methods of this general type and which is refining such that higher precision for the mutual alignment is achieved by decoupling the mutual alignment of the connector housings from their mutual fixation.

With the foregoing and other object in view there is provided, in accordance with the invention, an optical connector system, comprising:

two multiway connectors each having a connector housing with a longitudinal axis and a plurality of individual plug connectors float-mounted in the connector housing;

a plurality of alignment aids on the connector housing and an individual alignment element on each of the individual plug connectors;

the connector housings of the two multiway connectors being provided with substantially identical alignment aids disposed such that, when one of the multiway connectors is rotated through 180° about the longitudinal axis thereof with respect to the other one of the multiway connectors, the alignment aids cooperate with one another; and a coupling bush for axially fixing the housings of the two connectors to one another in a mating position thereof.

In other words, the objects of the invention are satisfied with the two connector housings that are each provided with the same alignment aids. Further, the alignment aids—when one multiway connector is rotated through 180° about its longitudinal axis with respect to the other multiway connector—cooperate with one another, and in that the two connector housings are fixed axially to one another by means of a coupling bush.

For the purposes of the invention, the term alignment aid means mechanical elements whose design and shape mean that they are suitable for contributing to the mutual prealignment of the connector housings; in particular, webs, tongue and groove combinations, guide surfaces or pins are suitable for use as alignment aids.

One major advantage of the new connector system is that, by forming identical alignment aids on both connector housings, their tolerances and the necessary clearance fits are reduced, so that the alignment aids are prealigned with respect to one another over a tolerance band which is comparatively small. During the rest of the mating process, only minor alignment movements of the individual plug connectors to be coupled are then required. This significantly increases their life, which is dependent on the number of mating cycles, and the reproducibility of the optical coupling quality (coupling efficiency) is considerably increased. In this case, the coupling bush carries out only tasks related to mechanical fixing after completion of the mating process, although coupling bush production tolerances do not affect the mutual positioning of the individual plug connectors.

In accordance with an added feature of the invention, the alignment aids are tab-shaped projections on the face edge of the connector housing. This refinement of the connector system is preferred with regard to production engineering and handling. In addition to their alignment function, the projections which project beyond the end edge of the connector housing can advantageously provide reliable protection of the sensitive ends and alignment elements of the individual plug connectors.

In accordance with an additional feature of the invention, the projections extend by different amounts, seen in the mating direction of the connectors. This development of the invention is advantageous for a step-by-step prealignment process during the mating process and with respect to the use of connector housings of identical design.

In accordance with another feature of the invention, each of the connector housings has a longitudinal edge, a top, and a bottom, and the alignment aids are arranged on the longitudinal edges and in a central area of the top and the bottom of the connector housing. The cited protective function of the alignment aids is reinforced in accordance with this further advantageous refinement of the invention.

In accordance with a concomitant feature of the invention, the two connectors are mateable in a defined mating direction, and at least one of the alignment aids forms a limit stop to a movement of the connector housing in at least two degrees of freedom at right angles to the mating direction. This is particularly advantageous for handling and with respect to having as small a number of alignment aids as possible.

Other features which are considered as characteristic for the invention are set forth in the appended claims.

Although the invention is illustrated and described herein as embodied in an optical connector system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The FIGURE of the drawing is a perspective view of a connector system according to the invention.

DESCRIPTION OF THE PREFERRED EMBODIMENT

Referring now to the sole FIGURE of the drawing in detail, the FIGURE shows an optical connector system having a coupling bush 1 and two multiway connectors 10. Multiway connectors are essentially designed to be identical, and are shown only in their functional position—rotated through 180° about the longitudinal axis. Nevertheless, the same reference symbols are used in the following text for corresponding elements of the two multiway connectors.

Each of the multiway connectors comprises a connector housing 11, by means of which they can be inserted in the mating direction A or B, respectively, from a respective one of the open sides 1a, 1b of the coupling bush. Thus, in the state shown in the FIGURE, the coupling bush 1 would in fact already very largely have received the multiway plug connectors, and would correspondingly surround the connector housings. The coupling bush is shown separately above the multiway plug connectors only to lend more clarity to the illustration.

A plurality of individual, conventional plug connectors 14—of them by way of example—are mounted in a floating manner in each connector housing 11. The individual plug connectors may be in the form of so-called MT ferrules, which are known per se, and have alignment elements which emerge or start on their respective coupling end face 16. The alignment elements 14a are configured in a known manner (see European published patent application EP 0 712 015 A2), for example as centering pins extending beyond the coupling end face 16 in the mating direction A, B, and corresponding centering holes starting on the end face 16. These alignment elements are used to align an individual plug connector 14, which is mounted in the right-hand housing 11, with respect to an equivalent, corresponding individual plug connector mounted in the lefthand housing 11. In order to produce high-quality optical couplings between the optical conductors, which are only indicated in the FIGURE, they are held by the respective individual plug connector 14 and end at the end face 16, and corresponding optical conductor ends (coupling partners) of the respective associated individual plug connector in the other multiway plug connector, the respective coupling partners must be aligned with high accuracy with respect to one another. When using the prior art alignment elements, this can be ensured only if the alignment elements are prealigned with respect to one another, within a comparatively small tolerance band, during the mating process.

The connector housings 11 thus have the alignment aids explained in more detail in the following text. Apart from this, the FIGURE shows kink-protection sleeves 18, which originate from the connector housings, on the optical conductor cables which end at the individual plug connectors and emerge at the rear. Both narrow sides of the multiway plug connector housings 11 have sprung locking levers 20 with locking tabs 20a and operating surfaces 20b arranged on them. The locking tabs 20a latch in recesses 1e in the coupling bush 1 when they are mated.

Alignment aids in the form of projections 22a, 22b, 22c and 23a, 23b, 23c, respectively, are formed on the longitudinal edges 11a of the connector housings 11 and in the central area of the top 11b and bottom 11c, respectively. The projections are advantageously formed integrally as attachments on the connector housing, and are preferably produced in the same injection-molding process. The projections extend beyond the face edge 24 of the connector housings in the mating direction A or B, and extend by different amounts. The projections 22a, 22b on the right-hand connector housing 11 therefore extend further in direction B than the projection 22c formed on the bottom 11c. In a corresponding way, the projections 23a, 23b formed on the longitudinal edges of the top are shorter than the projection 23c arranged centrally on the top. The projections 23a and 23b are formed with a rectangular L-shaped cross section and, when they interact with the respective opposite projection 22a or 22b, respectively, they cut off the freedom of movement of the connector housing 11 in two lateral degrees of freedom at right angles to the mating direction B. The projection 22c cooperates with the projection 23c and passes under it into contact with the left-hand connector housing 11.

In the illustrated exemplary embodiment, two projections which protrude farther thus each cooperate with projections, which are correspondingly set farther back, on the opposite connector housing. The cooperating alignment means (tab-like projections) on the connector housings result in the two connector housings 11 being directly prealigned with respect to one another irrespective of the tolerance and internal contour of the coupling bush, before the alignment elements 14a on the individual plug connectors 14 start to cooperate with their complementary alignment elements on the coupling partner, with the respective individual plug connectors being finely aligned with respect to one another.

The arrangement of the projections also results in prepositioning in all the directions at right angles to the mating direction A, B. Those projections which protrude beyond the edge 24 also have a second function for protection of the sensitive coupling end faces and alignment elements of the individual plug connectors 14. The tab-shaped leading projections also allow a separating plane in the form of a grid (but which cannot be seen in the drawing) to be arranged in the central area of the coupling bush 1, which separating plane helps to satisfy electrical shielding requirements when metallized plastic is used for the coupling bush 1. The formed area 1c which can be seen on the top of the coupling bush 1 forms an internal groove id, which interacts with a web 30 or the projection 23c on the left-hand connector housing. The internal groove 1d on the left-hand side of the coupling bush 1, and the corresponding formation of an identical groove on the underneath in the right-hand side of the coupling bush 1 ensure that the two multiway connectors 10 are inserted in the correct position, rotating through 180° about the longitudinal axis, into the coupling bush 1. This thus reliably prevents incorrect insertion attempts or incorrect mating attempts.

I claim:

1. An optical connector system, comprising:

two multiway connectors each having a connector housing with a longitudinal axis and a plurality of individual plug connectors float-mounted in said connector housing;

a plurality of alignment aids on said connector housings and an individual alignment element on each of said individual plug connectors;

said connector housings having a face edge, and said alignment aids being a plurality of long tab-shaped projections and a plurality of short tab-shaped projections on said face edge of said connector housing, said connector housings of said two multiway connectors being provided with substantially identical alignment aids disposed such that, when one of said multiway connectors is rotated through 180° about the longitudinal axis thereof with respect to the other one of said multiway connectors, said long tab-shaped projections cooperate with said short tab-shaped projections; and a coupling bush for axially fixing said housings of said two connectors to one another in a mating position thereof.

2. The connector system according to claim 1, wherein each of said connector housings has a longitudinal edge, a top, and a bottom, and said plurality of long tab-shaped projections and said plurality of short tab-shaped projections are arranged on said longitudinal edges, and at least one of said long tab-shaped projections and at least one of said short tab-shaped projections are arranged in a central area of said top and said bottom of said connector housing.

3. The connector system according to claim 2, wherein said short tab-shaped projections on said longitudinal edges are provided with a rectangular L-shaped cross section.

4. The connector system according to claim 2 or 3, wherein said at least one long tab-shaped projection in said central area forms a projection on said connector housing, and said at least one long tab-shaped projection cooperates with a groove of said coupling bush.

5. The connector system according to claim 1, wherein said two connectors are mateable in a defined mating direction, and at least one of said alignment aids forms a limit stop to a movement of said connector housing in at least two degrees of freedom at right angles to the mating direction.

* * * * *